Sept. 1, 1959  J. D. LANGDON  2,902,074
TIRE PLUG
Filed Feb. 11, 1958

INVENTOR
J D Langdon

United States Patent Office 2,902,074
Patented Sept. 1, 1959

2,902,074
TIRE PLUG

Jesse D. Langdon, Long Beach, Calif.

Application February 11, 1958, Serial No. 714,620

1 Claim. (Cl. 152—370)

This invention pertains to plugs made of rubberlike material adapted to repair punctured pneumatic tires, with the primary purpose in view to eliminate seepage or leakage of pneumatic pressure around the stem of the plug and between the inner tire wall and a head provided for the plug and resting against the inside of the tire wall surrounding the pneumatic chamber of the tire.

Other and further objects and purposes will appear during the progress of the specification as illustrated by the drawings which is diagrammatic for the purpose of illustration only and may be changed within the scope of the claim.

The reduction to practice, illustrated by the drawing is as follows.

Figure 1:
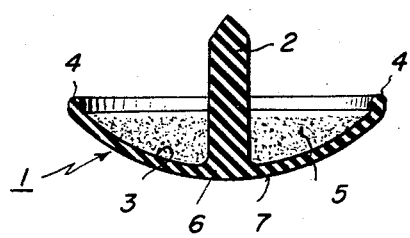
Figure 1 is a medium section through the plug in its preferred form showing an umbrella-like head for the plug provided with a cylindrical peripheral rim.
Figure 2:
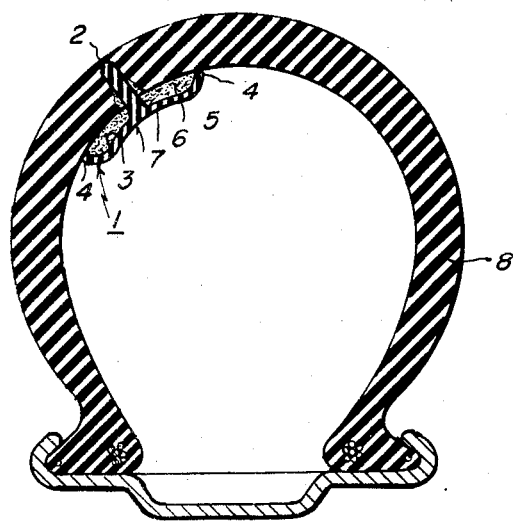
Figure 2 is a sectional view of the invention applied to a tubeless type of tire mounted on a rim secured to a fragment of a disc wheel.

This invention comprises of an umbrella-shaped plug 1 having an axial stem 2 extending from a concavity 3 of the umbrella same having a periphery constituting cylindrical annular ridge 4 projecting in the same direction as said stem 2 and presenting a substantially narrow edge forming a bearing surface adapted to contact the inside wall of said tire 8, an annular concavity surrounding said stem adapted to contain a viscous adhesive substance 5 capable of flowing around said stem 2, into and closing any orifice adjacent to said stem 2, the adhesive 5 being capable of curing and setting when exposed to atmosphere. Figure 1 illustrates a type of plug having a cylindrically ridged peripheral rim 4 surrounding an annular cavity 3 preferably filled with a self vulcanizing plasticized type of adhesive material 5 capable of flowing under pressure exerted against the pressure side 7 of the head 6 which is opposite the concavity 3.

It will be noted that the head 6 presents a curved or crowned surface as at 6 which is the preferable form and has the effect of urging the peripheral cylindrical ridge 4 radially outward under pressure, at the same time equalizing the pressure within and outside the head 7 causing the plastic material 5 to be urged in the direction of least resistance and squeezed around the stem 2 and toward the outside of the tire 8 filling any irregularities due to the nature of a puncture which often presents a ragged edge.

This invention is of particular value in sealing punctures in the form of a slit, as the cylindrical peripheral ridge 4 of plug head 6 acts as anchor means setting up resistance to tearing of the tire fabrics and at the same time filling the ends of the slit with plastic adhesive substance.

Having described the invention and the use thereof I claim:

A puncture repair plug for pneumatic tires comprising an umbrella shaped plug having an axial stem extending from the concavity of the umbrella, said plug having a periphery comprising an annular cylindrical ridge projecting in the same direction as said stem and presenting a narrow edge forming a bearing surface adapted to contact the inside wall of said tire, the annular concavity surrounding said stem adapted to contain a viscous adhesive substance capable of flowing around said stem, into and closing any orifice adjacent to said stem, the adhesive being capable of curing and setting when exposed to atmosphere.

References Cited in the file of this patent
UNITED STATES PATENTS

| | | |
|---|---|---|
| 583,436 | Hatch | May 25, 1897 |
| 583,437 | Hatch | May 25, 1897 |
| 746,207 | Vosburgh | Dec. 8, 1903 |